United States Patent
Ha

(10) Patent No.: US 6,519,014 B2
(45) Date of Patent: Feb. 11, 2003

(54) ARRAY SUBSTRATE FOR A TRANSFLECTIVE LIQUID CRYSTAL DISPLAY DEVICE AND THE FABRICATING METHOD

(75) Inventor: Kyoung-Su Ha, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/749,906

(22) Filed: Dec. 29, 2000

(65) Prior Publication Data

US 2001/0015777 A1 Aug. 23, 2001

(30) Foreign Application Priority Data

Dec. 31, 1999 (KR) ............................................. 99-67855

(51) Int. Cl.[7] ............................................. G02F 1/1368
(52) U.S. Cl. ........................... 349/43; 349/147; 349/139
(58) Field of Search ............................... 349/12, 43, 110, 349/122, 139, 143, 147, 113; 257/59

(56) References Cited

U.S. PATENT DOCUMENTS 6,038,004 A * 3/2000 Nanno et al. ............... 349/139
6,067,131 A * 5/2000 Sato ........................... 349/110
6,256,077 B1 * 7/2001 Baek ........................... 257/59
6,310,669 B1 * 10/2001 Kobayashi et al. ........... 257/59
6,344,884 B1 * 2/2002 Kim et al. .................. 349/122

* cited by examiner

Primary Examiner—William L. Sikes
Assistant Examiner—P. R. Akkapeddi
(74) Attorney, Agent, or Firm—Birch, Stewart, Kolasch & Birch, LLP

(57) ABSTRACT

The invention provides an array substrate for a transflective liquid crystal display device, including: a thin film transistor having gate, data and drain electrodes on a transparent substrate; an insulation layer over the substrate while covering the thin film transistor, the insulating layer having a drain contact hole exposing the drain electrode of the thin film transistor; a reflective electrode having a transmitting hole on the insulation layer; and a transparent electrode covering the reflective electrode entirely, wherein either the reflective electrode or the transparent electrode contacts the drain electrode via the drain contact hole of the insulation layer. The fabrication method is also disclosed. The resistance between the reflective electrode and the transparent electrode can be reduced, and the fabrication method can be simplified.

5 Claims, 5 Drawing Sheets

ARRAY SUBSTRATE FOR A TRANSFLECTIVE LIQUID CRYSTAL DISPLAY DEVICE AND THE FABRICATING METHOD

CROSS REFERENCE

This application claims the benefit of Korean Patent Application Nos. 1999-67855 filed on Dec. 31, 1999 under 35 U.S.C. §119, the entirety of which is hereby incorporated by reference,

BACKGROUND

1. Field of the Invention

The present invention relates to a liquid crystal display (LCD)) device, and more particularly, to a transflective LCD device.

2. Description of Related Art

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

The two polarizers have a transmittance of 45% and, the two substrates have a transmittance of 94%. The TFT array and the pixel electrode have a transmittance of 65%, and the color filter has a transmittance of 27%. Therefore, the typical transmissive LCD device has a transmittance of about 7.4% as seen in FIG. 1, which shows a transmittance (in brightness %) after light passes through each layer of the device. For this reason, the transmissive LCD device requires a high, initial brightness, and thus electric power consumption by the backlight device increases. A relatively heavy battery is needed to supply a sufficient power to the backlight of such a device. However, this has a problem that the battery can not be used for a lengthy period of time.

In order to overcome the problem described above, the reflective LCD has been developed. Since the reflective LCD device uses ambient light, it is light and easy to carry. Also, the reflective LCD device is superior in aperture ratio to the transmissive LCD device.

FIG. 2 shows a typical reflective LCD device in cross section. As shown in FIG. 2, the reflective LCD device includes upper and lower substrates 8 and 10 with a liquid crystal layer 12 interposed. The upper substrate 8 includes color filter layers 4a, 4b and 4c (e.g., red, green, and blue) and a common electrode 6. The lower substrate 10 includes a switching element (not shown) and a reflective electrode 2.

Ambient light 100 passes through the upper substrate 8 and the liquid crystal layer 12 and is reflected on the reflective electrode 2. When electrical signals are applied to the reflective electrode 2 by the switching element, phase of the liquid crystal layer 12 varies. Then, reflected light is colored by the color filter layers 4a, 4b and 4c and displayed in the form of images.

However, the reflective LCD device is affected by its surroundings. For example, the brightness of ambient light in an office differs largely from that outdoors. Even in the same location, the brightness of ambient light depends on the time of day (e.g., noon or dusk).

In order to overcome the problems described above, a transflective LCD device has been developed. FIG. 3 shows a conventional transflective LCD device. As shown in FIG. 3, the conventional transflective LCD device includes upper and lower substrates 22 and 18 with a liquid crystal layer 20 interposed. The upper substrate 22 includes a color filter 104, and the lower substrate 18, referred to as an array substrate, includes a switching element (not shown), a pixel electrode 14 and a reflective electrode 2. The reflective electrode 2 is made of an opaque conductive material having a good reflectance and light transmitting holes "A" are formed therein. The transflective LCD device further includes a backlight device 16. The light transmitting holes "A" serve to transmit light 112 from the backlight device 16, The transflective LCD device in FIG. 3 is operable in transmissive and reflective modes. First, in reflective mode, the incident light 110 from the upper substrate 22 is reflected on the reflective electrode 2 and directed toward the upper substrate 22. At this time, when electrical signals are applied to the reflective electrode 2 by the switching element (not shown), phase of the liquid crystal layer 20 varies and thus the reflected light is colored by the color filter 104 and displayed in the form of images.

Further, in transmissive mode, light 112 generated from the backlight device 16 passes trough portions of the pixel electrode 14 corresponding to the transmitting holes "A". When the electrical signals are applied to the pixel electrode 14 by the switching element (not shown), phase of the liquid crystal layer 20 varies. Thus, the light 112 passing through the liquid crystal layer 20 is colored by the color filter 104 and displayed in the form of images.

Detailed explanation of the transflective LCD device and the fabrication method will be provided with reference to FIGS. 4, 5A and 5B. FIG. 4 is a partially enlarged plan view of an array substrate for a transflective LCD device according to a conventions art. As shown in FIG. 4, the array substrate has gate and data lines 25 and 27 crossing each other. A pixel region "p" is defined by the crossing. As a pixel electrode 19, there are a transparent electrode 19a and a reflective electrode 19b in the pixel region "p". The reflective electrode 19b has a reflective region "C" and a transmitting hole "A" as a transmitting region through which light from the backlight is transmitted. The pixel electrode 19 receives a signal from a TFT "T" having gate, source and drain electrodes 61, 63 and 65. The gate and source electrodes 61 and 63 are respectively extended from the gate and data lines 25 and 27. The drain electrode 65 is connected to the transparent and reflective electrodes 19a and 19b through first and second drain contact holes 65 and 71.

A fabrication method will be explained with reference to FIGS. 5A and 5B which are cross sectional views taken lines IV—IV and V—V of FIG. 4, respectively. First, on a substrate 59 a gate line 25 having a gate electrode 61 is formed. On the gate line 61, a first insulating layer 60 is formed using an organic material such as acetyl or benzocyclobutene (BCB) or an inorganic material such as silicon nitride or silicon dioxide. On the first insulating layer 60 over the gate electrode 61 sequentially formed are an active layer 62, source and drain electrodes 63 and 65, and a second insulating layer 64 having the first drain contact hole 67. On the second insulating layer 64 formed is the transparent electrode 19a contacting the drain electrode 65 through the first drain contact hole 67. The transparent electrode 19a has a hole corresponding to the second drain contact hole 71 that will be formed later.

Next, on the transparent electrode 19a an insulating material is deposited and patterned to form the protection layer 69 having the drain contact hole 71 exposing the drain electrode 65. On the protection layer 69 is formed the reflective electrode 19b having the transmitting hole "A" at the pixel region. The reflective electrode 19b contacts the drain electrode 65 via the second drain contact hole 71.

Meanwhile, since there are two electrodes 19a and 19b contacting the drain electrode 65 for pixel electrode 19 in this structure, the electric field applied to the liquid crystal can be deflected due to the difference of locations of the two electrodes 19a and 19b, leading to lower the driving efficiency of the liquid crystal. Further, since the second drain contact hole is deep enough to result in a crack of the protection layer 69 or the reflective electrode at the corresponding position, the resistance of the reflective electrode can increase than expected, and particles can be positioned at the crack position.

In order to overcome the problem, it can be considered to form a stacked structure of the transparent and reflective electrodes 19a and 19b, but when forming the transmitting hole "A" for the reflective electrode 19b, the transparent electrode can be hurt. Further, the etchant can react with the two electrodes 9a and 9b, lowering the characteristics of the electrodes.

SUMMARY OF THE INVENTION

Accordingly, the present invention is directed to a transflective liquid crystal display device that substantially obviates one or more of the problems due to limitations and disadvantages of the related art.

An object of the invention is to provide a transflective LCD device that can reduce the deflection of electric field applied to the liquid crystal.

Another object of the invention is to provide a fabrication method of the transflective LCD device that is comprised of simple steps.

In accordance with the purpose of the invention, as embodied and broadly described, in one aspect the invention includes an array substrate for a transflective liquid crystal display device, including: a thin film transistor having gate, data and drain electrodes on a transparent substrate; an insulation layer over the substrate while covering the thin film transistor, the insulating layer having a drain contact hole exposing tie drain electrode of the thin film transistor; a reflective electrode having a transmitting hole on the insulation layer; and a transparent electrode covering the reflective electrode entirely, wherein either of the reflective electrode or the transparent electrode contacts the drain electrode via the drain contact hole of the insulation layer.

The reflective electrode beneficially has aluminum.

In another aspect of the invention, provided is a method of fabricating an array substrate for a transflective LCD device, including: forming a thin film transistor on a substrate, the thin film transistor having a gate electrode, a source electrode, and a drain electrode; forming an insulation layer on the thin film transistor; forming a drain contact hole exposing the drain electrode of the thin film transistor by patterning the insulation layer; forming a reflective electrode having a transmitting hole on the insulation layer; and forming a transparent electrode entirely covering the reflective electrode, wherein either of the reflective electrode or the transparent electrode contacts tile drain electrode via the drain contact hole.

Forming the drain contact hole can be processed, before forming the reflective electrode, thereby the reflective electrode contacting the drain electrode via the drain contact hole.

When forming the drain contact hole is processed after forming the reflective electrode, the transparent electrode contacts the drain electrode via the drain contact hole.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which:

FIGS. 7A and 7B cross-sectional views taken lines VI—VI and VII—VII of FIG. 6, respectively, and illustrate a fabrication method according to a first embodiment of the invention; and.

DETAILED DESCRIPTION OF PREFFERED EMBODIMENTS

Reference will now be made in detail to the preferred embodiment of the present invention, example of which is illustrated in the accompanying drawings.

The embodiments of the invention relate to a structure of reflective electrode and the transparent electrode for the transflective LCD device. In the embodiments, the reflective electrode having a transmitting hole is formed in advance to the transparent electrode.

Figure 1:
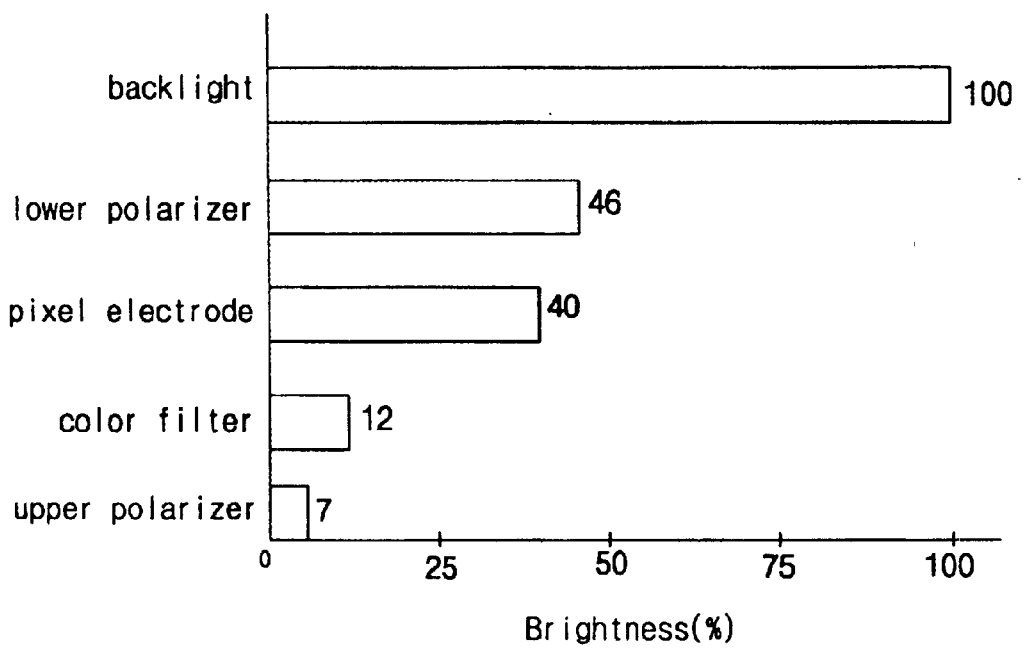
FIG. 1 is a graph illustrating transmittance after light passes through each layers of a typical transmissive LCD device.
Figure 2:
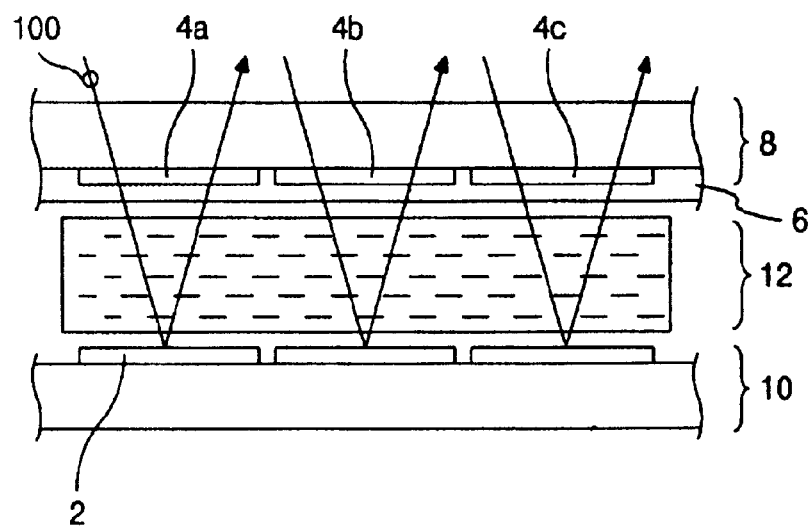
FIG. 2 is a cross-sectional view illustrating a typical reflective LCD device.
Figure 3:
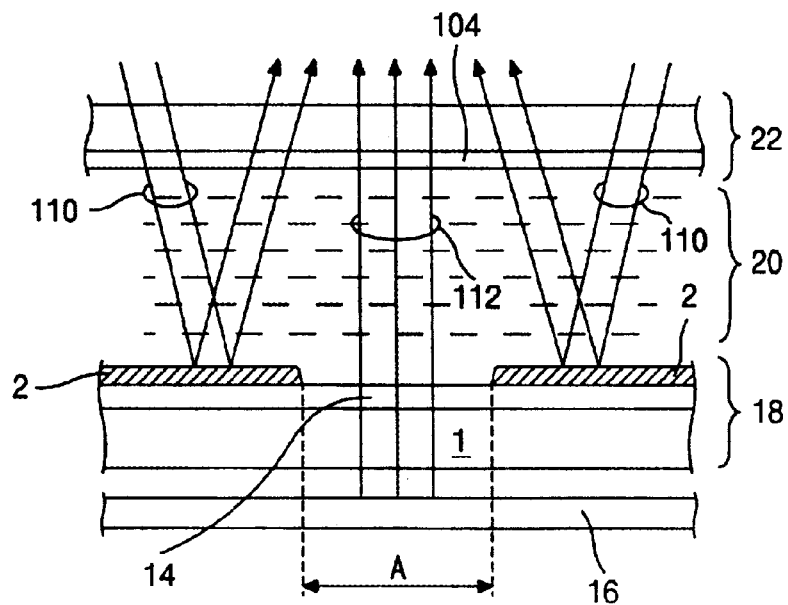
FIG. 3 is a cross-sectional view illustrating a conventional transflective LCD device.
Figure 4:
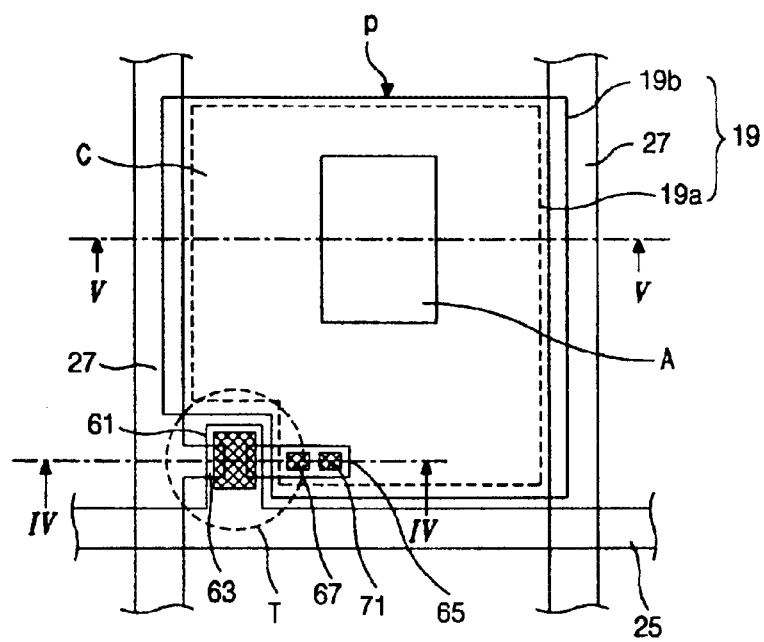
FIG. 4 is a plan view of a conventional transflective LCD device.
Figure 5A:
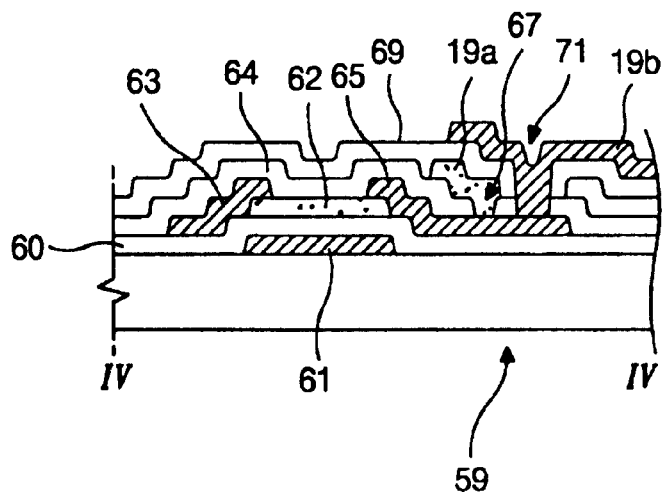
FIGS. 5A and 5B are cross-sectional views taken lines IV—IV and V—V of FIG. 4, respectively.
Figure 5B:
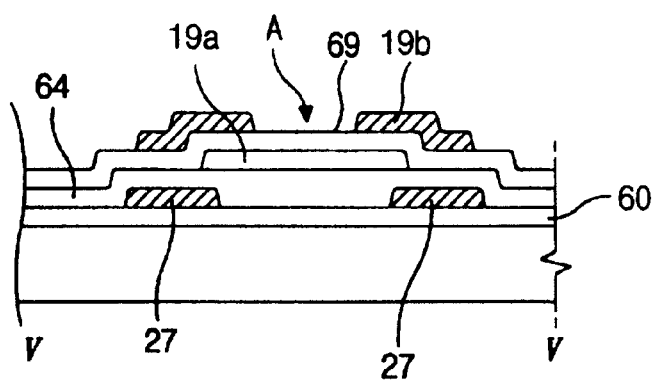
Figure 6:
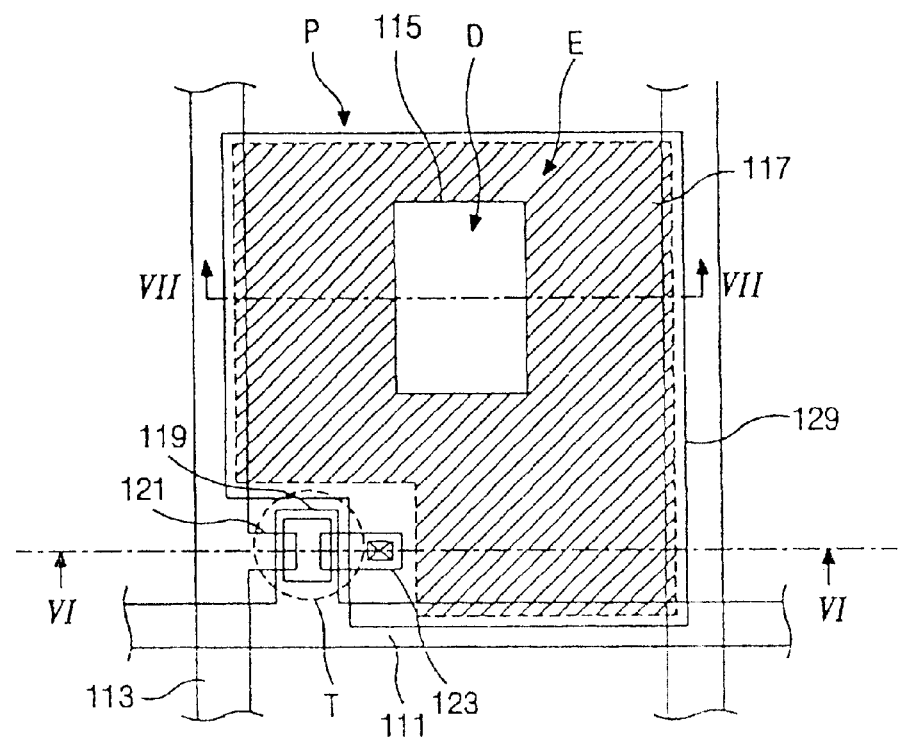
FIG. 6 is a plan view of an array substrate for a transflective LCD device according to the embodiments of the invention.

FIG. 6 is a plan view illustrating a configuration corresponding to one pixel of an array substrate for the inventive transparent LCD device. As shown in FIG. 6, the array substrate is comprised of gate and data lines 111 and 113, a pixel regions "P", and a thin film transistor "T". The pixel region "P" defined by the crossing of the gate and data lines 111 and 113 has a transmitting portion "D" and a reflective portion "E". The thin film transistor "T" is comprised of a gate line extended from the gate line 111, a source electrode 121 extended from the data line 113, and a drain electrode 123 spaced apart from the source electrode 121. The transmitting portion "D" corresponds to a transmitting hole 115 of the reflective electrode 117 on which the transparent electrode 129 is positioned.

Figure 7A:
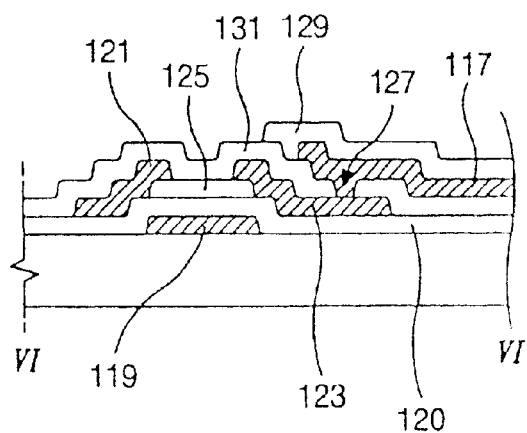
Figure 7B:
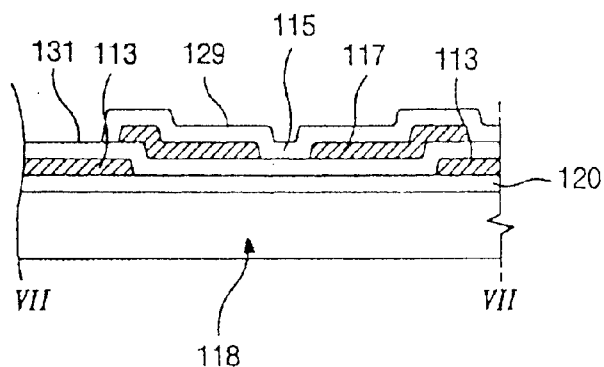

FIGS. 7A and 7B shows a fabrication method of the first embodiment of the invention. In order to form the gate line 111 (FIG. 6) having the gate electrode 119, a conductive material such as aluminum, Molybdenum, tungsten, and their alloy is deposited on a substrate and patterned, thereby defining a first intermediate structure.

Next, on the first intermediated structure, an insulation material such as silicon oxide or silicon nitride is deposited to form a first insulation layer 120. Next, the silicon layer is formed 125 on the first insulation layer 120, thereby defining a second intermediate structure.

Next, on the second intermediate structure, using conductive material, the source and drain electrodes 121 and 123 and the data line 113 are formed, thereby defining a third intermediate structure.

On the third intermediate structure, a second insulation layer 131 is formed and patterned to have a drain contact hole 127, thereby defining a fourth intermediate structure.

On the fourth intermediate structure, a conductive material beneficially having aluminum is deposited while filling the drain contact hole 127, and patterned into a reflective electrode 117 having a transmitting hole 115, thereby defining a fifth intermediate structure.

On the fifth intermediate structure, transparent conductive material such as indium tin oxide is deposited while filling the transmitting hole 115 of the reflective electrode 117 and patterned to form a transparent electrode 129 which covers the entire reflective electrode 117.

Figure 8A:
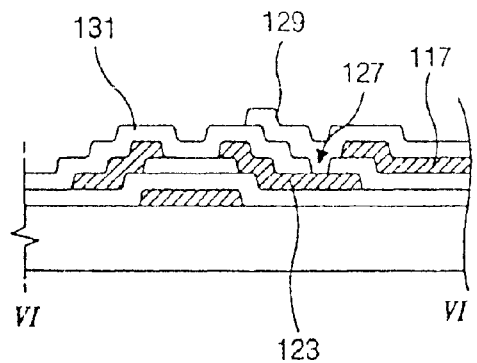
FIGS. 8A and 8B cross-sectional views taken lines VI—VI and VII—VII of FIG. 6, respectively and illustrate a fabrication method according to a second embodiment of the invention.
Figure 8B:
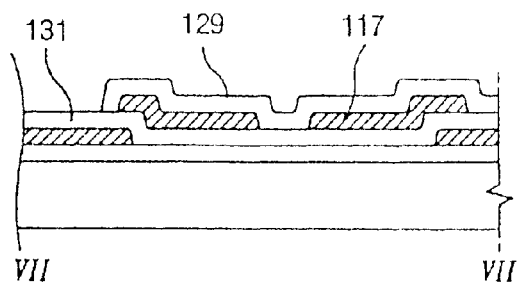

FIGS. 8A and 8B show another structure of the array substrate according to a second embodiment of the invention.

The processes before forming the second insulation layer 121 are same as those shown in FIGS. 7A and 7B, After depositing the insulation material on the third intermediate structure, patterning for a drain contact hole is not immediately processed. The reflective electrode 117 is formed on the second insulation layer 121 and after that, the second insulation layer 121 is patterned to form the drain contact hole 127. After forming the drain contact hole 127, the transparent electrode 129 is formed while filling the drain contact hole 127. Thus, the reflective electrode 117 does not contact tile drain electrode 123 directly but indirectly through the transparent electrode 129.

Generally, the contact resistance between the transparent conductive material and the metal alloy such as aluminum alloy is big. Thus, if the contact area is small, the electric conductivity is bad. But, since the contact area is large according to the embodiments of the invention, the contact resistance cannot affect much the conductivity between them. Further, since the transparent electrode 129 covers the reflective electrode 117 entirely, the etchant for patterning the transparent electrode 129 does not affect the reflective electrode 117.

And more further, the protection layer between the reflective electrode and the transparent electrode is not anymore necessary in this structure and only one drain contact hole is necessary, thus the fabrication method can be simplified.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An array substrate for a transflective liquid crystal display device, comprising:

a thin film transistor having gate, source and drain electrodes on a transparent substrate an insulation layer over the substrate while covering the thin film transistor, the insulating layer having a drain contact hole exposing the drain electrode of the thin film transistor;

a reflective electrode having a transmitting hole on the insulation layer; and a transparent electrode covering the reflective electrode entirely, wherein either the reflective electrode or the transparent electrode contacts the drain electrode via the drain contact hole of the insulation layer.

2. The substrate of claim 1, wherein the reflective electrode is comprised of aluminum.

3. A method of fabricating an array substrate for a transflective LCD device, comprising:

forming a thin film transistor on a substrate, the thin film transistor having a gate electrode, a source electrode, and a drain electrode;

forming an insulation layer on the thin film transistor;

forming a drain contact hole exposing the drain electrode of the thin film transistor by patterning the insulation layer;

forming a reflective electrode having a transmitting hole on the insulation layer; and forming a transparent electrode entirely covering the reflective electrode, wherein either the reflective electrode or the transparent electrode contacts the drain electrode via the drain contact hole.

4. The method of claim 3, wherein forming the drain contact hole is processed, before forming the reflective electrode, thereby the reflective electrode contacting the drain electrode via the drain contact hole.

5. The method of claim 3, wherein forming the drain contact hole is processed after forming the reflective electrode, thereby the transparent electrode contacting the drain electrode via the drain contact hole.

* * * * *